(12) United States Patent
Gia

(10) Patent No.: US 6,401,038 B2
(45) Date of Patent: Jun. 4, 2002

(54) PATH PLANNING, TERRAIN AVOIDANCE AND SITUATION AWARENESS SYSTEM FOR GENERAL AVIATION

(76) Inventor: Min-Chung Gia, No. 12, Alley 68, Lane 294, Section 4, Cheng-Kung Rd, Nei-hu, Taipei (TW)

( * ) Notice: Subject to any disclaimer, the term of this patent is extended or adjusted under 35 U.S.C. 154(b) by 0 days.

(21) Appl. No.: 09/859,407

(22) Filed: May 18, 2001

Related U.S. Application Data

(63) Continuation of application No. 09/340,025, filed on Jun. 28, 1999, now Pat. No. 6,317,690.

(51) Int. Cl.[7] ............................................. G01C 21/04
(52) U.S. Cl. .............................. 701/301; 701/9; 342/65
(58) Field of Search ................................. 701/300, 301, 701/302, 4, 9, 10, 14; 342/357.08, 357.14, 64, 65

(56) References Cited

U.S. PATENT DOCUMENTS

| | | | |
|---|---|---|---|
| 5,047,916 A | 9/1991 | Kondo | 700/61 |
| 5,086,396 A | 2/1992 | Waruszewski, Jr. | 701/221 |
| 5,892,462 A | 4/1999 | Tran | 340/961 |
| 5,978,715 A | 11/1999 | Briffe et al. | 701/11 |
| 6,021,374 A | 2/2000 | Wood | 701/301 |
| 6,043,756 A | 3/2000 | Bateman et al. | 340/945 |
| 6,076,042 A | 6/2000 | Tognazzini | 701/301 |
| 6,085,147 A | 7/2000 | Myers | 701/209 |

Primary Examiner—Tan Nguyen
(74) Attorney, Agent, or Firm—Bacon & Thomas

(57) ABSTRACT

A number of navigation functions are performed on terrain navigation space. One function is to define a dynamic dangerous zone based on flight altitude by locating and aggregating a set of nodes of terrain height over a minimum flight altitude. Algorithms such as collision check, mountainous area boundary and region growing techniques are developed as basic operations for this terrain model. In addition, a visibility graph approach for dynamic route selection may be adapted to reduce the real-time computational requirements. This approach reduces the size of the search space by establishing a partial visibility graph of terrain and avoids details of the terrain, which do not influence the choice of flight path, independent of the size of the navigation space. By exploiting the multiple and variable resolution properties of Oct-tree terrain models, a series of CFIT warning functions using terrain data as reference are implemented efficiently with existing on-board terrain data resources.

6 Claims, 9 Drawing Sheets

From DASSAULT ELECTRONIQUE GCAS s = SIZE   k = ELEVATION   j,i = PLANAR COORDINATE Locational code = $<00001473>_{16} = 3184_{10}$   Projection code = $<00001033>_{16}$ $k = <00000100>_2 = 4_{10}$ Locational code = $<0000148c>_{16} = 3212_{10}$   Projection code = $<00001088>_{16}$ $k = <00000101>_2 = 5_{10}$

DANGER NODES IN NAVIGATION SPACE.

■ — LINE ELEMENTS OF DIRECT PATH.
▣ — COLLISION NODES.

○ DIAGONAL NEIGHBOURS OF VERTICES NODES, POSITION OF WAYPOINT.
NW,NE,SW,SE REPRESENT DIAGONAL DIRECTION NEIGHBOURS.

EXPANSION FROM NODE 21 TO ITS FOUR MAIN DIRECTION NEIGHBOURS RECURSIVELY

WAYPOINTS ARE LOCATED ACCORDING TO THE VERTICES

PATH PLANNING, TERRAIN AVOIDANCE AND SITUATION AWARENESS SYSTEM FOR GENERAL AVIATION

This application is a Continuation of nonprovisional application Ser. No. 09/340,025 filed Jun. 28.1999 now U.S. Pat. No. 6,317,690.

BACKGROUND OF THE INVENTION

1. Field of the Invention

This invention generally relates to a system for reducing controlled flight into terrain accidents and in particular it relates to terrain data processing and algorithms for terrain awareness and warning systems to prevent controlled flight into terrain accidents.

2. Brief Description of the Prior Art

Controlled Flight into Terrain (CFIT) warning uses the data provided by a flight management computer, Global Positioning System (GPS) receiver and other aircraft data providing systems. The prior art of CFIT warning predicts a three-dimensional flight path based upon a curve-fit extrapolation of the most recent position and velocity data received. This predicted flight path is then compared with the internal terrain map of the immediate area and an assessment of the potential threat of aircraft collision with terrain is computed. The type of systems described above could look up to 120 seconds in advance. This is the so-called "time to clear" in contrast to "time before impact" warning, and also "terrain avoidance" in contrast to terrain "awareness".

The effort to reduce CFIT accidents by U.S. Airlines can be traced back to 1974. The prior art of standard Ground Proximity Warning System (GPWS) uses radio altimeter data to provide an audible warning if an aircraft has insufficient terrain clearance. Flying into precipitous terrain can result in late warnings since the standard GPWS depends upon a downward looking radio altimeter to detect rising terrain.

"Enhanced" version of GPWS-EGPWS, which is available from AlliedSignal, and Ground Collision Avoidance System (GCAS), which is available from Sextant Avionique, graphically depict terrain surrounding the aircraft's flight path on a cockpit display and provide earlier warning. Both systems are built around a three-dimensional terrain database and implement a true predictive look-ahead capability that is based on aircraft climb performance. The technology has three parts: use of GPS and other highly accurate navigation systems to provide precise positioning with updates in seconds; computer technology with greater speed and memory; and accurate, sophisticated worldwide terrain databases including a Digital Terrain Elevation Database (DTED) of the world. FIG. 1 shows schematic system diagram of GPWS, which is from DASSAULT ELECTRONIQUE GCAS.

In EGPWS and GCAS, the terrain database is the system's core. Looking-ahead algorithms compare the projected future position of the aircraft with this database and warnings are issued on this basis. The using of DTED allows the systems to display terrain in proximity to the aircraft. During the flight, the peaks and terrain below the aircraft in DTED can also be displayed for situation awareness to the pilot. Looking ahead warnings based on comparison between flight profile or flight path and terrain can be used to give an advanced alert. During emergency descents in mountainous areas and during en-route avoidance of inclement weather, looking-ahead warning further helps to prevent any situation that could lead to a CFIT.

However, the terrain database occupies large amounts of memory. If the terrain is mapped at 100-meter intervals over a region 10000Km by 10000Km, there are $10^{10}$ grid points. Clearly, the computations inherent in continuously accessing $10^{10}$ grid points are formidable and it is necessary to reduce, or compress this information. Besides, many navigation functions can be done with knowledge of terrain, such as allowing for optimum flight plan or emergency change of route in a real time situation, which could be restrained by the amount of data retrieved and the cost of computation when complexities of the algorithms are increased. Another major drawback of DTED files is that it only provides elevation data. Without further processing or aid from other formats of terrain data, such as features or vector representations, DTED gives no geometrical relationship among data elements.

SUMMARY OF THE INVENTION

There are many applications, particularly in flight management, where the complete DTED database must be accessed to determine or revise the flight waypoints. The terrain awareness warning and navigation safety related issues described here are performed on an encoded terrain navigation space. The encoding of a grid file of Digital Terrain Elevation Data (DTED) is based on a variant of quad-tree representation of spatial data structures. Each element of a DTED file is encoded in a Morton numbering sequence with respect to its location in the grid file, a scaled elevation data, and coverage of homogeneous (equal elevation) area as features. Under this data structure, a DTED is organized as a set of integer numbers with ascending sequence. Each integer represents a node in which planar location, scaled elevation and coverage are interlaced with a set of position bits to form an integer. The encoded list is defined as the terrain Oct-tree model. Navigation functions not only make reference to terrain Oct-tree for elevation data, but also perform processing and operations on it. The navigation space is transferred from the DTED array to its encoded integer list.

A number of navigation functions are performed on the terrain Oct-tree based navigation space. A preferred embodiment uses a dynamic dangerous zone defined by flight altitude. In the preferred embodiment, a set of nodes of terrain height over a minimum flight altitude are located and aggregated. Algorithms such as collision check, mountainous area boundary and region growing technique are developed as basic operations for this terrain model. Yet another preferred embodiment which takes a visibility graph approach for dynamic route selection has been adopted to reduce the real-time computational requirements. This approach reduces the size of the search space by establishing a partial visibility graph of terrain and avoids details of the terrain, which do not influence the choice of flight path, independent of the size of the navigation space.

Several forms of CFIT warning functions of aircraft navigation become feasible once an aircraft flight path and the topology of a region of terrain can be readily determined. Furthermore, it implies access to a database holding the terrain data in order to initiate the geometric computations. By exploiting the multiple and variable resolution properties of Oct-tree terrain models, a series of CFIT warning functions using terrain data as reference are easily implemented. The functions including Ground Proximity Warning, Obstacle Cueing, Terrain Masking, Perspective Images of Terrain, Passive Ranging, Real-time Route Selection and Route Planning, Weather Display Overlaying, and Waypoint Overlaying.

Prior art planning approaches use pre-defined obstacle models. Moreover, the number of data retrieving DTED and the cost of computation are in the negative. In the present invention, the dangerous zones dynamically vary during the execution of a flight plan. Besides, a layer of Oct-tree terrain is used to facilitate the on-line operation capability.

Other objects and advantages of the present invention will become apparent from the detailed description to follow taken in conjunction with the appended drawings.

DETAILED DESCRIPTION OF PREFERRED EMBODIMENTS

1. Terrain Model

In the image processing field, a quad-tree can represent a two dimensional region (in a 2n×2n binary array format) by recursively sub-dividing the array into quadrants. If the quadrant consists of a mixture of 1s or 0s, it is further sub-divided into quadrants and this process is repeated until a quadrant consists only of 1s or 0s (termed leaf node). In practice large regions of 1s (or 0s) are represented by a single quadrant or node of the tree. Similarly, three-dimensional objects can be represented by Oct-trees where a $2^n \times 2^n \times 2^n$ array is sub-divided into octants. If the elements of an octant are common, the Oct-tree terminates; otherwise eight further sub-octants are generated to represent the octant in more detail.

In the present preferred embodiment, a variant of the Oct-trees structure is adopted. A fourth parameter S is added to represent the size of a leaf node. A single 3-D locational code can represent an area of terrain surface by its three-dimensional co-ordinates and size information. The method of mapping a peak point (I, J, K) of terrain surface to the locational code of a node is formed by bit interleaving the triplet (I, J, K) and S as a hexadecimal value such that the S bit precedes the K bit, the K bit precedes the J bit, and the J bit precedes the I bit at each position. After interleaving (I, J, K) and S, the locational code is one of the set of digits {0,1,2,3,4,5,6,7,8, C}. The number of times that digit '8' or 'C' appears in the location code gives the size information of a merged node.

Figure 1:
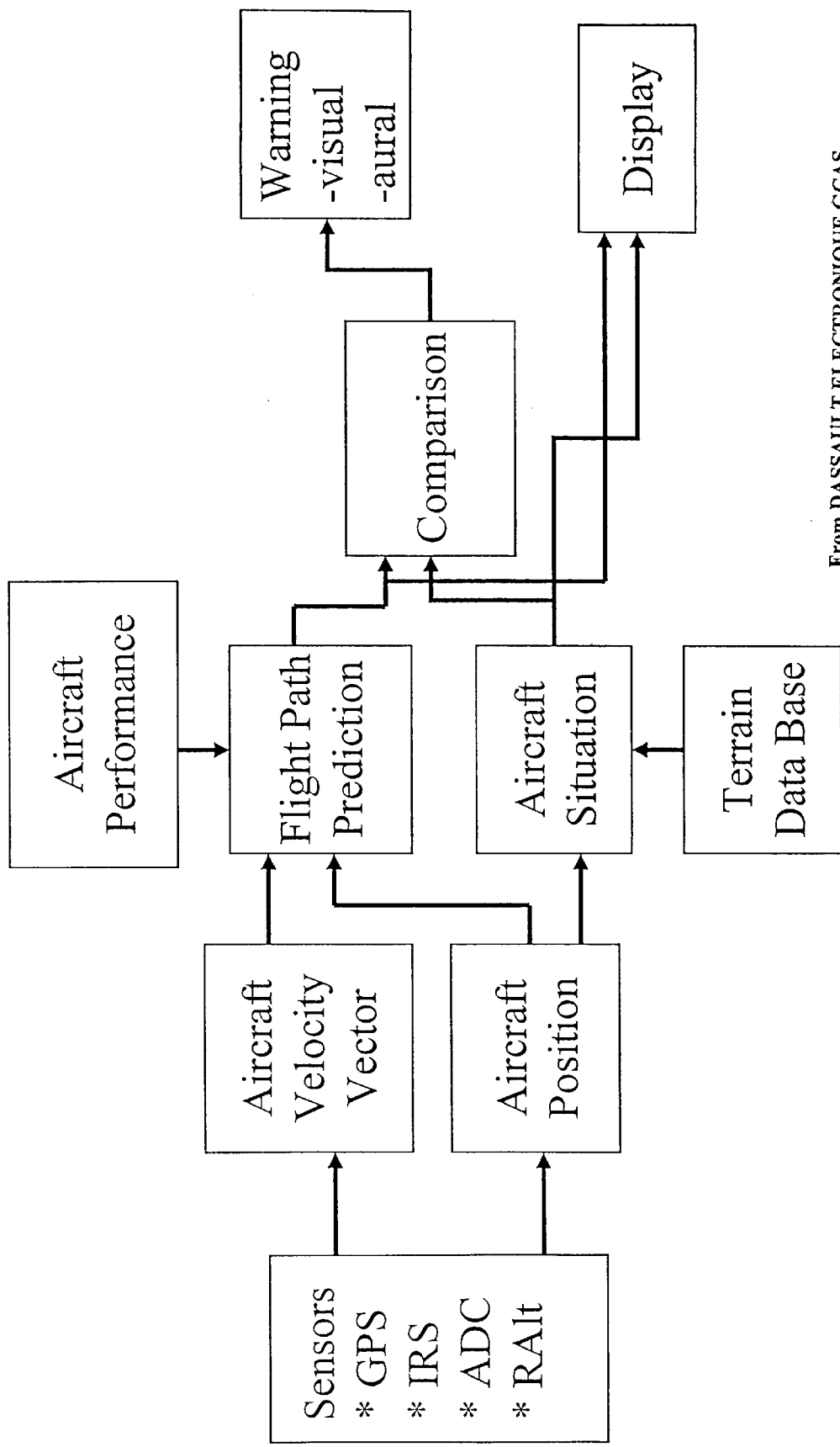
FIG. 1 shows a schematic system diagram of a prior art of GPWS.
Figure 2:
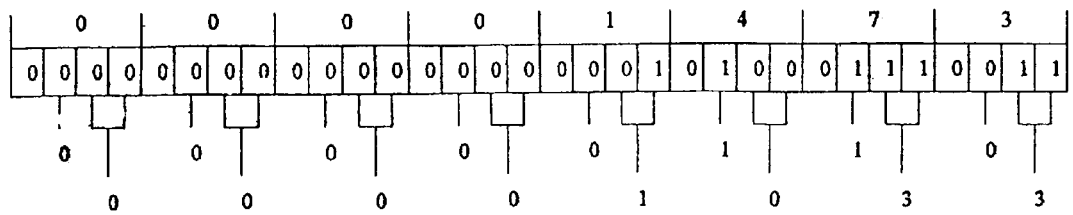
FIG. 2 shows bit interleaving of locational code and 2-D, 3-D projection.
Figure 2:
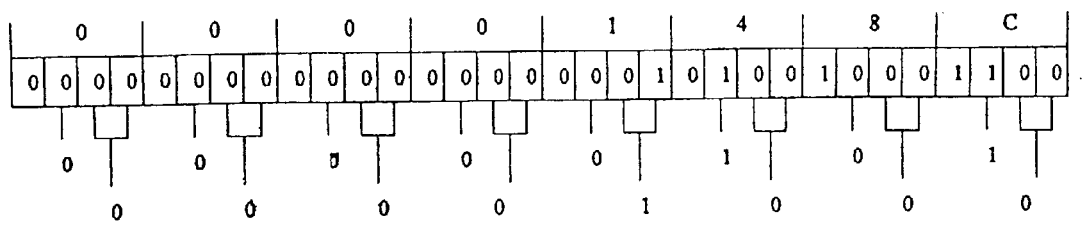

In the example of FIG. 2, the combination of the $4^{n-1}$th bits (i.e., the combination of the first bit of each digit) of a node is equal to the binary representation of value I. This is repeated for the $(4^{n-1}+1)$th bits to J, the $(4^{n-1}+2)$th bits to K and the $(4^{n-1}+3)$th bits to form the size value S respectively, where n (n=1,2...) is the resolution parameter. Although the four components of a node (i.e., I, J, K, S) are totally independent, they are represented by a single value. Both the encoding and decoding process can be performed by the use of bit-wise operations under this bit interleaving scheme.

The addressing schemes used in terrain Oct-trees are Morton numbering sequences, which are formed by bit interleaving as previously described. The 2-D locational code can be obtained by the use of modulo-4 operations to the I, J bits of the 3-D locational code, where the K bits are assigned to 0, and the S bits are left unchanged. In FIG. 2, the projection of a node $<00001473>_{16}$ on the IJ plane is $<00001033>_{16}$; for the merged node $<0000148c>_6$ the projection code is $<00001088>_{16}$.

2. Modeling of the Navigation Space

In general, existing methods of path planning consist of two phases. In the first phase, a search space is generated consisting of all the possible paths that will avoid the obstacles between a start point and a goal point. Once the search space is created, the second phase is to search for a path which satisfies specific constraints. These approaches are typically based on the assumption that the navigation space (obstacles, terrain, and threat) is static and is fully known a priori.

Many prior art flight path planning algorithms exploit knowledge of the 'cost' of paths in the navigation space to extract an optimal path by minimizing some objective function which defines the 'cost' of a path. These algorithms are variants of the 'shortest path problem'. A common strategy is the pre-processing of the search space to reduce the real-time computation cost. The pre-processing approaches can be classified in two categories, one which organizes the graph of the search space according to the terrain altitude and the other which embeds pre-computed cost values in a graph of the search space. The flight path planning algorithm described in this invention is based on constraints of flight altitude, flight distance and time to goal. Although the aircraft knows the navigation space, the obstacles vary with operational constraints and are therefore explored in real-time, during the mission.

The flight path planning algorithm described in the present invention is performed on a terrain Oct-tree representation of the navigation space and without the use of any other data formats to represent terrain features (linear or polygonal features). Since the set of obstacles dynamically change with flight altitude, a static polygonal representation of obstacles is not suitable for real-time dynamic flight path planning. The terrain Oct-tree is organized as a linear list in which each element represents a leaf node of the tree. Each node is represented as a single integer and represents a homogeneous set of elements of the grid file. The use of an Oct-tree simplifies the extraction of obstacles from a terrain database.

An Oct-tree terrain model contains both two-dimensional (2-D) and three- dimensional (3-D) information. However, the method of tree encoding allows straightforward one-toone projections between 2-D quad-tree space and the corresponding node in 3-D Oct-tree space. This allows a 3-D flight path to be computed in quad-tree space, considerably simplifying the computation task. The use of 2-D representations also simplifies such tasks as the location of neighboring points, determination of a path segment between two points and transformations between geographic co-ordinates and node addresses.

Figure 3A:
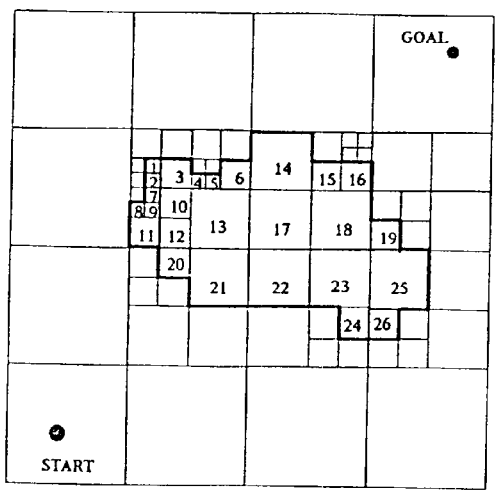
FIGS. 3(a)–3(b) show an example of navigation space with danger nodes.
Figure 3B:
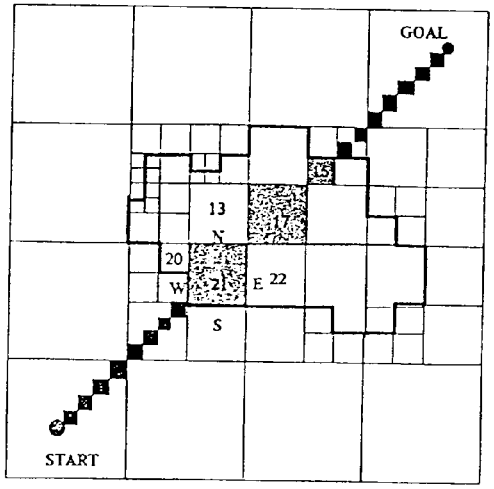
Figure 4:
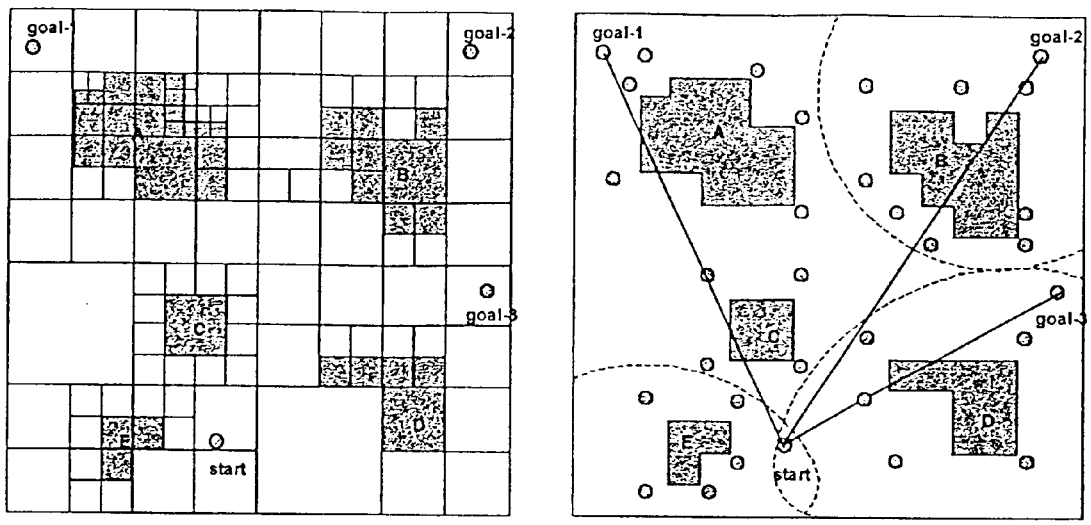
FIG. 4 shows possible dangerous zones with respect to heading.

3. Core Path Planning Algorithm
3.1 The Extraction of Obstacles
3.1.1 Exploring the Obstacles The nodes in a terrain Oct-tree with scaled elevation values above a flight altitude are known as "danger nodes", in the sense that an aircraft cannot safely enter a region of the terrain occupied by these nodes. The danger node list is a sub-set of the quad-tree representing the nodes of the navigation space. However, the list of danger nodes does not give any explicit topographic information (for example, connectivity or boundary conditions) in the navigation space. In FIG. 3, a danger area containing 26 nodes is shown, organized as an ordered list where it is not clear if node 1 or node 26 belong to the same connected region. Moreover, although the danger nodes are 'scattered' throughout the navigation space, only a few of the danger nodes will jeopardize a specific flight path. For instance, in FIG. 4, there are five connected danger regions but, for a path to goal 1, the possible obstacles are limited to regions A and C.

The danger nodes related to the current direction are termed obstacle nodes and are organized as a set of locational codes, which represent the coverage of dangerous zones in the aircraft navigation space. The organizing of obstacles involves the following steps:

(1) A list of danger nodes is extracted from the terrain Oct-tree according to an elevation threshold value. The terrain is organized as bands or layers with a suitable vertical scale factor K, for example, 20 m bands. Each node of the Oct-tree is examined to see if its K value (embedded in the locational code) exceeds the threshold. Nodes with K value less than the threshold can be ignored. The resultant list contains all the potential danger nodes in the navigation space.

(2) Using a 'generate and test' paradigm, the obstacle nodes list is obtained by collision check (or intersection detection) of the direct path which lies between a given start point (S) and a goal point (G). The direct path is a line between points S and G to determine the Oct-tree nodes on a straight line between the points S and G. Each point along the line, beginning at point S, is checked against the list of danger leaf nodes. If a point on the line matches any danger node, then the danger leaf node is stored in a list for subsequent expansion of the dangerous zone. Sometimes, more than one component of a point along a direct path will intersect with the same obstacle node.

(3) A connected dangerous zone is grown to locate the vertices of the region as waypoints. A dangerous zone expansion process involves finding the obstacle leaf nodes adjacent to the leaf node being expanded. The major purpose of this expansion process is to obtain a set of waypoints corresponding to the dangerous zone in navigation space; these waypoints are subsequently used as possible flight path deviations to avoid a collision with the terrain.

3.1.2 Dangerous Zone Expansion

Computing the locational codes of its neighbors in four main directions expands the obstacle leaf node. This operation is performed recursively until a boundary node is reached which does not have any neighboring nodes in the list of danger leaf nodes. The size of a neighboring node may be different from the size of a current 'expanding' node, where the size of a $2^d$ by $2^d$ node is $2^d$ and the level of the node is defined as d. The danger node list is searched for a neighbor of equal size. If an equal size neighbor is not found in the list, the search is repeated for a neighbor with a larger size and this process repeats until a neighbor is found or the tree level next to the root is reached.

Figures 5A, 5B:
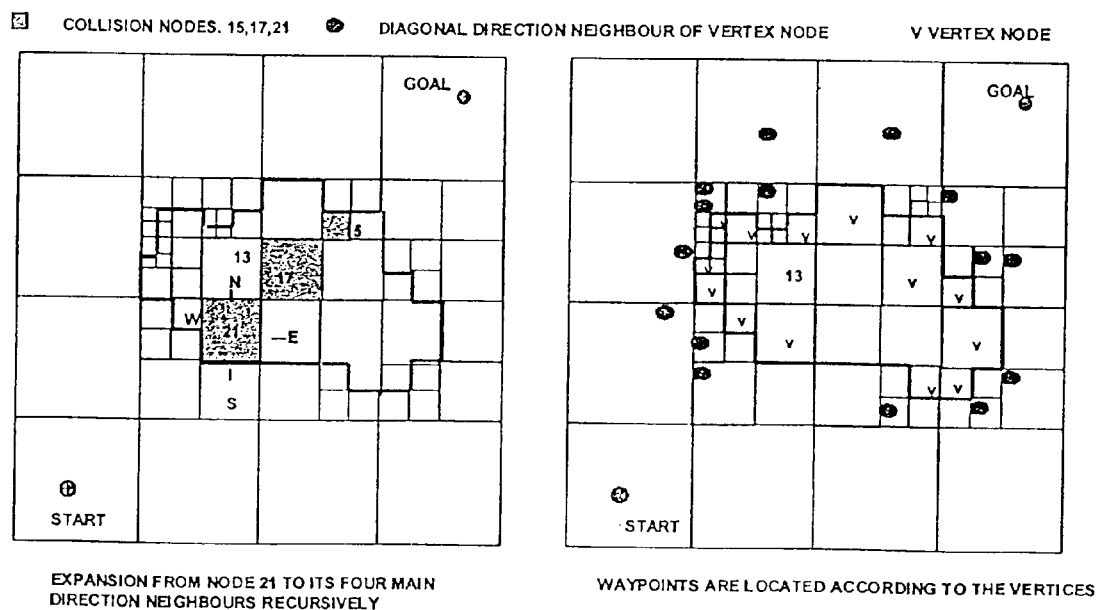
FIGS. 5(a)–5(b) show an example of using binary search of danger node list to determine the boundary nodes during dangerous zone expansion (dangerous zone refer to FIG. 3).

If a neighbor node is still not found after this process, it indicates that either some smaller size neighboring nodes exist or the node is a boundary node. If the node is not present in the node list, it may be contained in a merged node in an upper level. The node with the projection code which is used in the last comparison loop of a binary search procedure actually covers or is covered by the query node. This feature can be exploited to determine if any quadrants of the same size-neighboring node exist. If the neighboring node of the node under test covers the locational code, which is used in the last comparison loop, a further search is necessary, otherwise the current expanded node is a boundary. For example, the expansion process of node 21 in FIG. 3 encounters a boundary in the 'south' direction, connects obstacle nodes in the north and east directions, and needs further processing to the next level in the 'west' direction as shown in FIG. 5.

Figure 6:
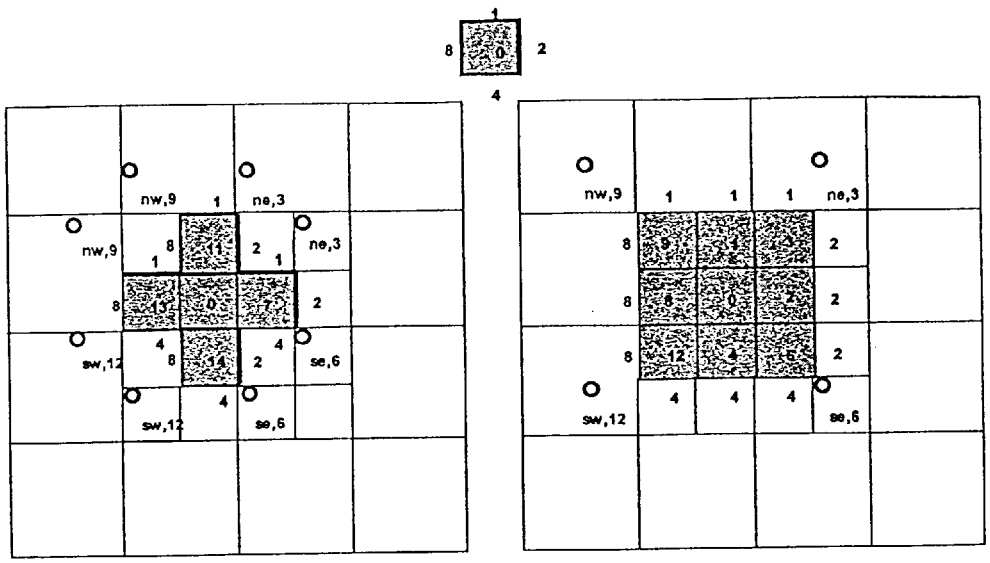
FIG. 6 shows a combination of boundary type and waypoint position.

The boundary type of an obstacle is encoded using the additive codes 1, 2, 4 and 8 corresponding to the sides on the northern, eastern, southern and western boundaries, respectively. Zero indicates a node that does not have any side that is on the boundary. FIG. 6 shows a dangerous zone and the potential positions of waypoints. For example, a node with a boundary code of 13 is a vertex node. It has two waypoints in the NW and SW diagonal direction. A waypoint is represented by the locational code of the northwest corner of its neighbors in the diagonal direction. It is also necessary to check that a waypoint is not a member of the list of danger nodes and does not already exist in the waypoints list, before it can be appended to the list of waypoints.

Two further approaches can be applied to reduce the size of an expansion node or to use a coarser level node approximation. The first approach is implemented when more detailed information is required. It is achieved by subdividing the currently expanded node and expanding each sub-quadrant individually. In this case, the currently expanded node is treated as a boundary node and its boundary type is updated. This process is performed recursively until either a neighboring node is found or the process reaches a boundary node. In the second method, the hierarchical features of a terrain Oct-tree are exploited. In order to reduce the number of vertices (and hence reduce the size of the visibility graph), rather than the size of the currently expanded node, the locational code of an equal size neighboring node is assigned as a boundary node and the expansion process is terminated. This is an approximation process that 'truncates' nodes below the current expanded resolution level. The boundary code of a currently expanded node is updated as described above.

3.1.3 Waypoint Location

Figures 7A, 7B:
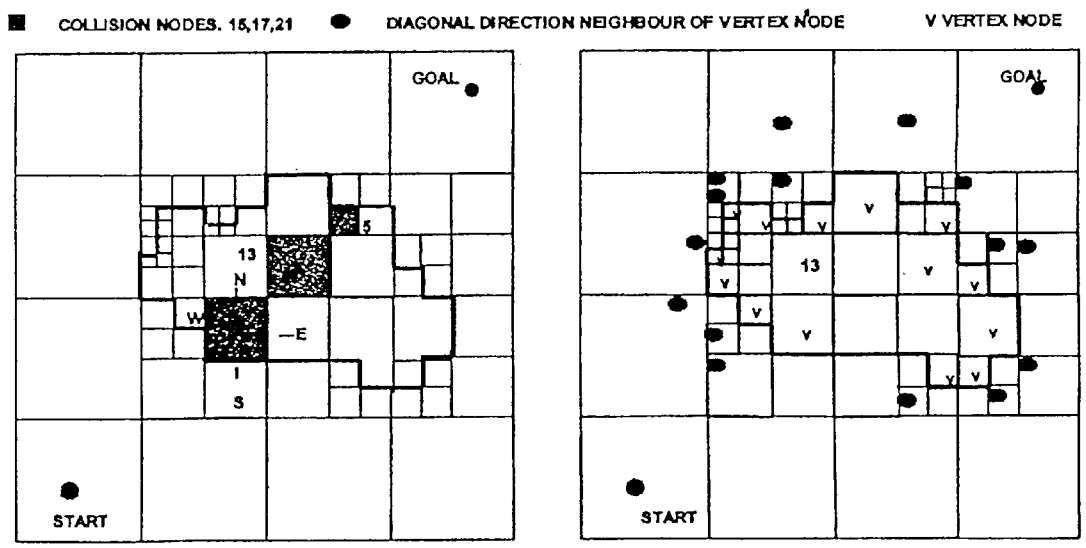
FIG. 7 shows dangerous zone expansion and waypoints derivation.
Figure 8A:
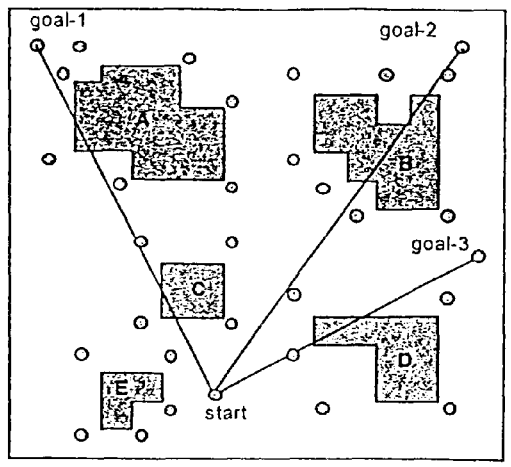
FIGS. 8(a)–8(d) show dangerous zones with respect to different start and goal point.
Figure 8B:
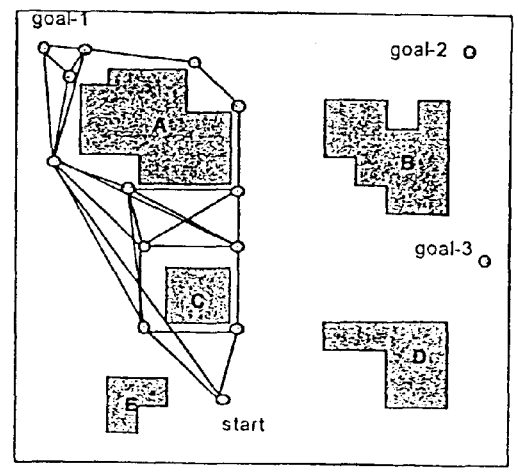
Figure 8C:
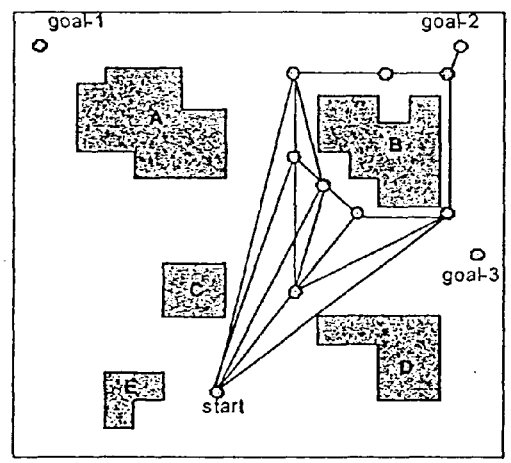
Figure 8D:
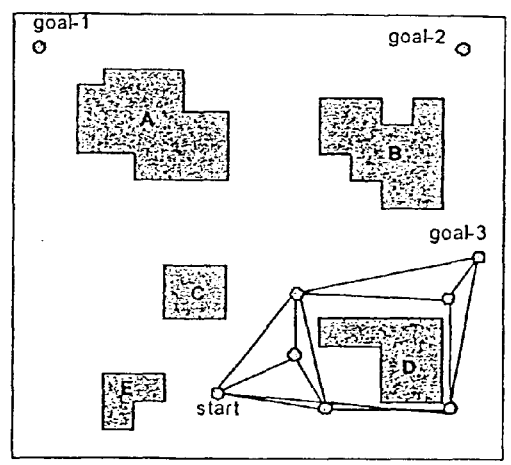

Whenever a neighbor is located, it indicates that further expansion is needed in that current direction, otherwise the node has encountered a boundary node. After all the four main directions are examined, the boundary type of an obstacle node is obtained. From the boundary type, it is straightforward to determine if the node is an obstacle node. The expansion process proceeds recursively from the neighboring nodes and an obstacle nodes list is used to refer to nodes which have been expanded, in order to avoid examining the same obstacle nodes repeatedly. FIG. 7a shows the expansion of a dangerous zone. During this expansion process, the boundary type of a boundary node is obtained in order to determine if it is a vertex of a dangerous zone. If it is a vertex node, a waypoint is then created in the 'diagonal direction' adjacent to the dangerous zone, as shown in FIG. 7b.

After the expansion process has been applied to all the members of the SEED list, the dangerous zones are obtained along a direct flight path between the start and goal point, which is dependent on the overall direction of the flight path. FIG. 8a–d shows a gaming area with danger nodes and corresponding regions of obstacles along the different direct paths between the start and goals nodes. The actual topography information of the dangerous zones is extracted from the specific terrain Oct-tree and is transformed into a set of waypoints. These waypoints are then used to construct a visibility graph in the navigation space, to determine the optimal path.

3.2 Transformation of Navigation Space

The construction of a visibility graph is based on a set of waypoints obtained during the acquisition stage. This set of waypoints provides the implicit geographic information of the dangerous zones in navigation space. The algorithm consists of considering all pairs of points ($W_{from}$, $W_{to}$), where $W_{from}$ and $W_{to}$ are start, goal, or intermediate waypoints of dangerous zones. To determine whether $W_{from}$ and $W_{to}$ are the endpoints of a valid flight path segment, 'collisions' are checked against dangerous zones of a straight line $W_{from}$ and $W_{to}$. The nodes between $W_{from}$ and $W_{to}$ are connected by a link in the visibility graph if, and only if, no intersection occurs in the segment joining the two points.

Figure 9:
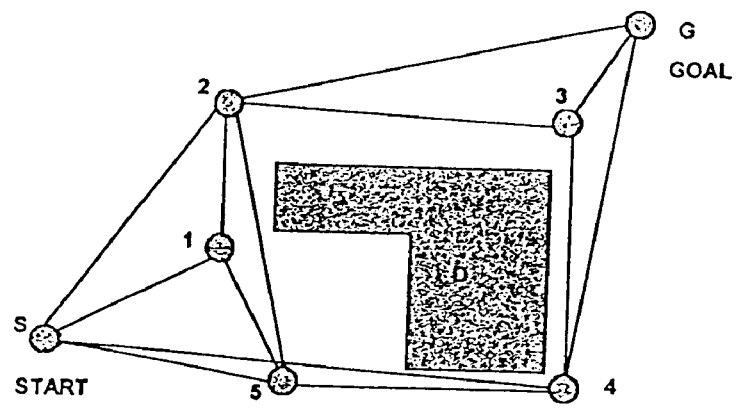
FIG. 9 shows a visibility graph and its tree structure.
Figure 9:
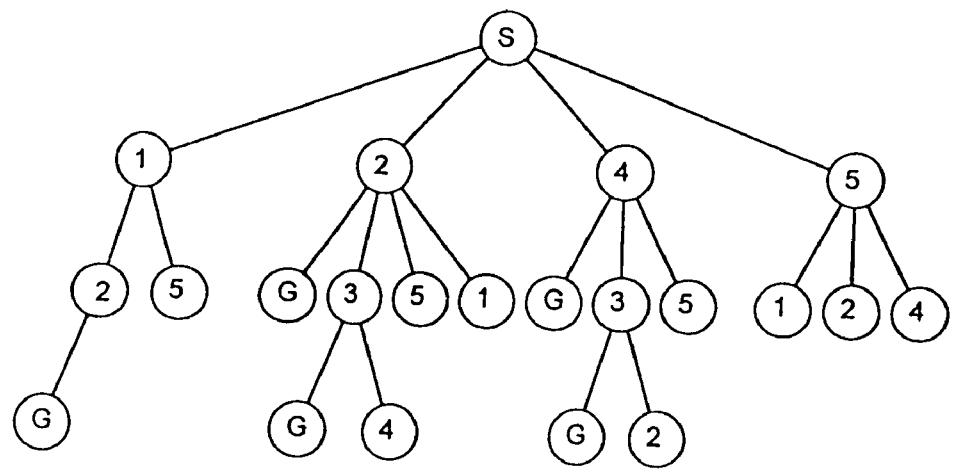

The criteria for collision checking is similar to the one used to check for collisions of direct paths between start and goal points. The test of a pair of waypoints is terminated as soon as a collision is detected, otherwise the test proceeds until $W_{to}$ is reached. After all the possible combinations of waypoint pairs are tested, the result is a visibility graph where the waypoints are the nodes of a graph and the path segments formed by the waypoints are the arcs of a graph. In FIG. 9, several paths exist which are composed of straight lines joining the start point to the goal point via a sequence of waypoints.

The visibility graph approach used is similar to the methods used in most paths planning problems where a visibility graph of the obstacle space is constructed from a list of polygonal obstacles. However, the following considerations are specific to a terrain Oct-tree based flight path planning algorithm:

The dangerous zones are obtained by gathering the obstacle nodes along an ideal direct path between the start and goal points and the possible obstacles are limited to those nearby the direct path (or current direction). This approach implies that the irrelevant danger nodes in the navigation space can be ignored and the number of waypoints is accordingly minimized. Because the waypoints only represent the subset of obstacles of the danger areas, this process provides a partial visibility graph of the total navigation space. FIG. 8a–d shows an example of partial configuration and its visibility graph.

During the collision check, $W*(W-1)/2$ waypoint pairs are considered where W is the number of waypoints, including the start point S and goal point G. The time complexity for construction of a visibility graph is proportional to $W*(W-1)/2$. For any navigation space, it can be readily observed that the number of waypoints W is less than the number of vertices n. Moreover, the size of a visibility graph containing W waypoints is smaller than the size of a visibility graph of n vertices. Clearly, significant improvements in the speed of searching can be obtained possible by reducing the size of a visibility graph.

3.3 Flight Path Searching

The visibility graph is represented in a form of a list of flight path segments as described in the previous section. The path planning problem has been transformed into the discrete problem of searching a visibility graph between a start node and a goal node. For example, FIG. 9 shows a visibility graph representing path segments of a navigation space. There are seven nodes in the graph including the start and goal points. It is reconstructed as a tree structure where the goal node G and other nodes appear more than once in the tree to illustrate its construction.

Several techniques can be used for searching for paths in a graph, such as depth-first, breadth-first and heuristic searches. A heuristic search method, constrained to minimize the number of connections has been incorporated in the flight path planning algorithm described in preferred embodiment. During the search, a path segment is chosen that is as distant as possible from the current position, in the expectation that it will be closer to the destination. On the other hand, the method of minimizing the length of the flight path entails an opposite approach to the search to minimize the connections. Cost functions are defined to evaluate the effect of adding waypoints to determine which set of waypoints should be expanded in the path planning routine.

Finding a truly optimal path would require an exhaustive search. However, an optimal path may not be essential to real-time airborne requirements because of the possible degradation in performance to extract the path. For a large number of nodes in a visibility graph, the computation load of an exhaustive approach is prohibitive, and a more efficient heuristic search method was adopted, based on a variant of Dijkstra's algorithm, which is also known as the A* method.

4. Real Time Dynamic Environment Application

As it is anticipated that an aircraft flight path needs to be modified in real-time to match flight conditions and changing obstacles in the environment, the terrain database is accessed for every flight plan change in order to re-form the visibility graph, based on the current obstacle space. This re-planning of a new flight path must be completed within a few seconds for real-time navigation, where this time interval includes the flight path planning computation and also the construction of the path searching space.

Typically, in a real-time navigation environment, a new flight path is required within a few seconds of a request. In practice, extracting waypoints and searching the visibility graph take a relatively small amount of time in comparison with the time taken for the whole path planning process. The strategy of applying the proposed path planning algorithm to the real time dynamic environment is based on observations from applying the algorithm to a specific terrain with randomly generated start and goal points and measuring the time spend on each stage. These measurements include the time to generate the waypoints, the time to construct a visibility graph and the time to find a path at a different resolution level of the terrain Oct-tree. These off-line results of the computation times are subsequently used as references for 'tuning' the real time dynamic flight path planning algorithm for a given terrain.

To vary the resolution of the navigation space, a pyramid of quad-trees is used to represent the navigation space and danger nodes. A layer k of a pyramid is obtained by applying a maximum value function on a 2×2 window at layer k+1.

However, at upper layers of a pyramid, the path may be obscured as a result of 'rounding' the tree nodes and consequently, no path may be found at that layer. In real time applications, it is preferable to avoid the bottleneck caused by establishing a large visibility graph at a detailed resolution layer. On the other hand, it is also important to avoid a coarser resolution layer, which effectively hides the valid path. The determination of the appropriate processing level can be accomplished by first obtaining the waypoints at a pre-defined level, estimating the size of visibility graph and then determining if it is necessary to switch to another layer for path planning.

Figure 10:
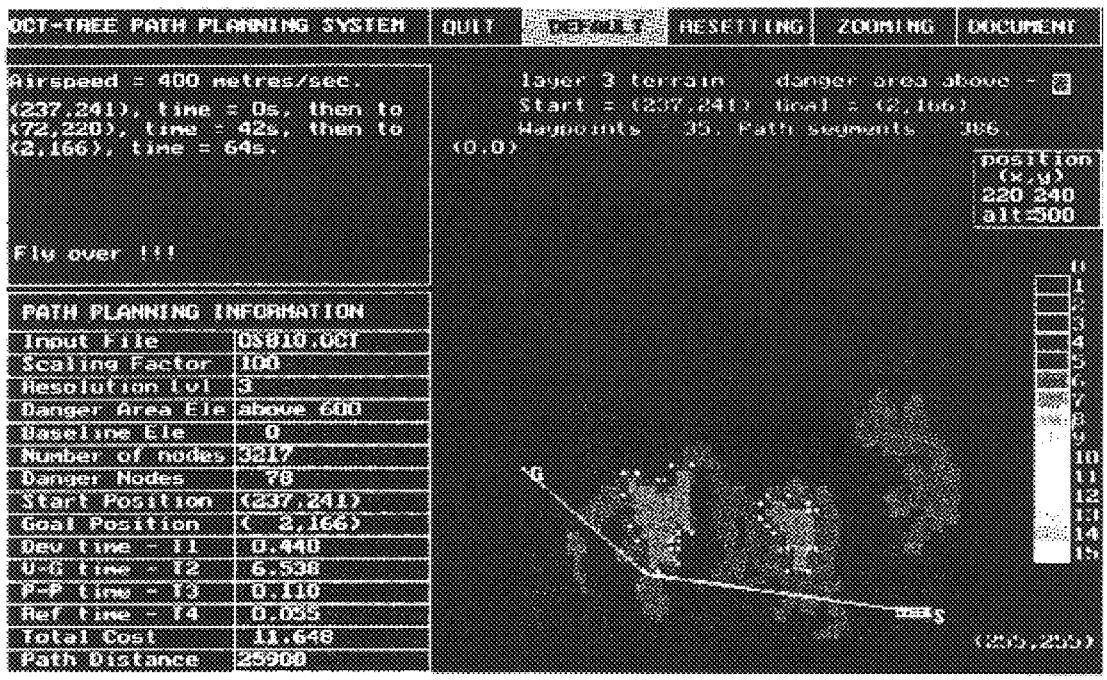
FIG. 10 shows an example of embodiment of real time flight path planning.
Figure 10:
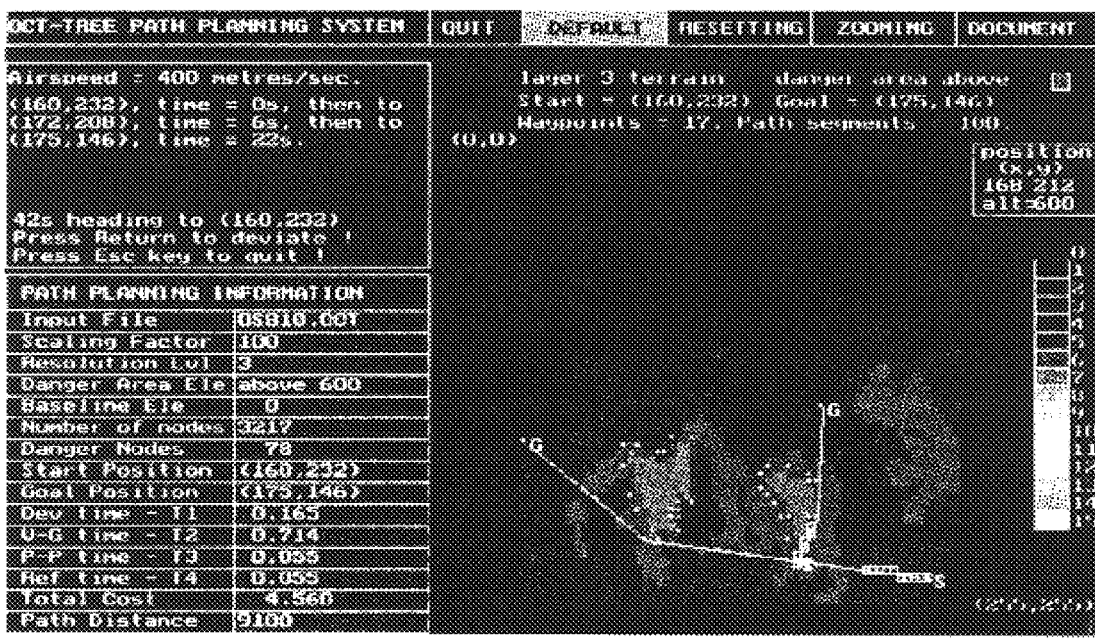

For example, FIG. 10 demonstrates a real time simulation by continuously changing the goal point during a flight mission, in which the initial start point is (255,101) and the goal point is (96,251). Airspeed of 400 m/sec is predefined and the flight altitude and operation layer is set interactively by the user. During the flight, a new goal point (241,242) is given for new flight path planning; the algorithm predicts the new start point as (204,148) according to a 5-second constraint. The path is found in the same layer and flight altitude as shown in FIG. 10. Different baselines, scaling factors, time constraints and flight altitude are also applied.

The DTED source file is 1:50000 Scale Height Data termed Digital Terrain Model Data (DTM) provided by the Center for Space and Remote Sensing Research, National Central University, Taiwan ROC. The DTM file consists of height values at each intersection of a 40 meter horizontal grid, with values mathematically interpolated from the contours on the SPOT Landmass maps containing 256K height values for a 20.48 km square DTM 'tile'. The source file can be as large as $2^{16} \times 2^{16}$ grid points, but has been restricted to $2^9 \times 2^9$ grid points to simplify the encoding process.

As described above, the path planning algorithm can be performed at a coarser layer of a pyramid to meet real time constraints. However, the terrain elevation data is continuously varying and the terrain Oct-tree representation is terrain dependent, thus the location and connectivity of the obstacles with respect to a given flight altitude are unpredictable. Generally, the actual operation layer of the path planning process is determined by the minimum flight altitude, which in turn determines the number of waypoints. A low flight altitude will generate a large number of danger nodes and obstacle nodes, thus a coarser operational layer may be adopted to keep the number of waypoints below a predefined margin for a specific operational environment. As the real time application depends on the performance of the computing system and the aircraft speed, the real time constraint, the allowable times for the planning and the predefined layer of process are changeable.

5. Terrain Avoidance and Situation Awareness

5.1 Dynamic Obstacles and Weather Condition Avoidance

Figure 11:
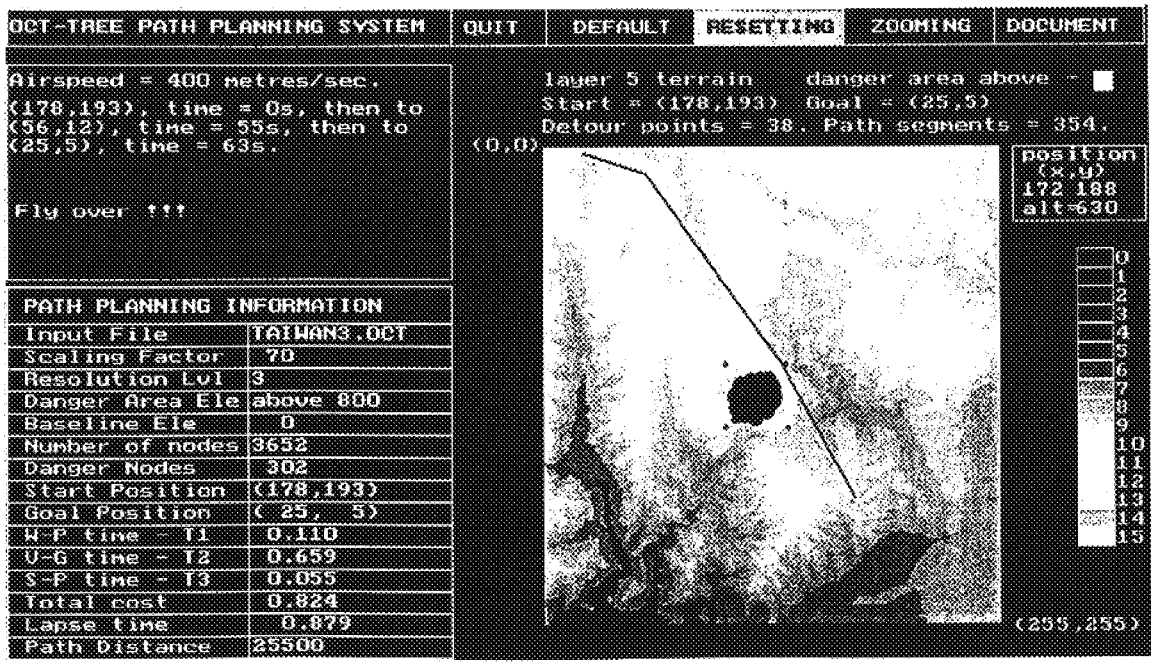
FIG. 11 shows an example of embodiment of obstacles avoidance.

The present invention not only provides warnings in accordance with surrounding terrain, but also gives the information of terrain alone flight path ahead, which is obtained from path planning function. Once a new route has been on-line programmed, the warning function of GPWS and GCAS can be easily coupled. Other types of hazards coverage area such as obstacles, peaks, weather conditions (thunderstorms, windshear or any meteorological situations that appear in airspace) can also be represented as a set of locational codes overlaying the terrain map and performed in the same way as described above. FIG. 11 shows an example.

The generating of terrain map and computing of line-of-sight terrain masking of the dangerous zone, peaks, and obstacles with respect to a selected flight altitude and heading use the same locational code representations. An accessing algorithm is used to retrieve parameters of nodes in the terrain model. The I, J, K parameters give the planar position and elevation of a node, and different color codes from a mapping table are assigned to each elevation band; S representing the coverage area of said node to form said masking area. The subset of nodes representing dangerous zone, peaks, and obstacles is obtained from collision checking and region finding with homogeneous nodes.

5.3 Perspective Images of Terrain Model

Figure 12:
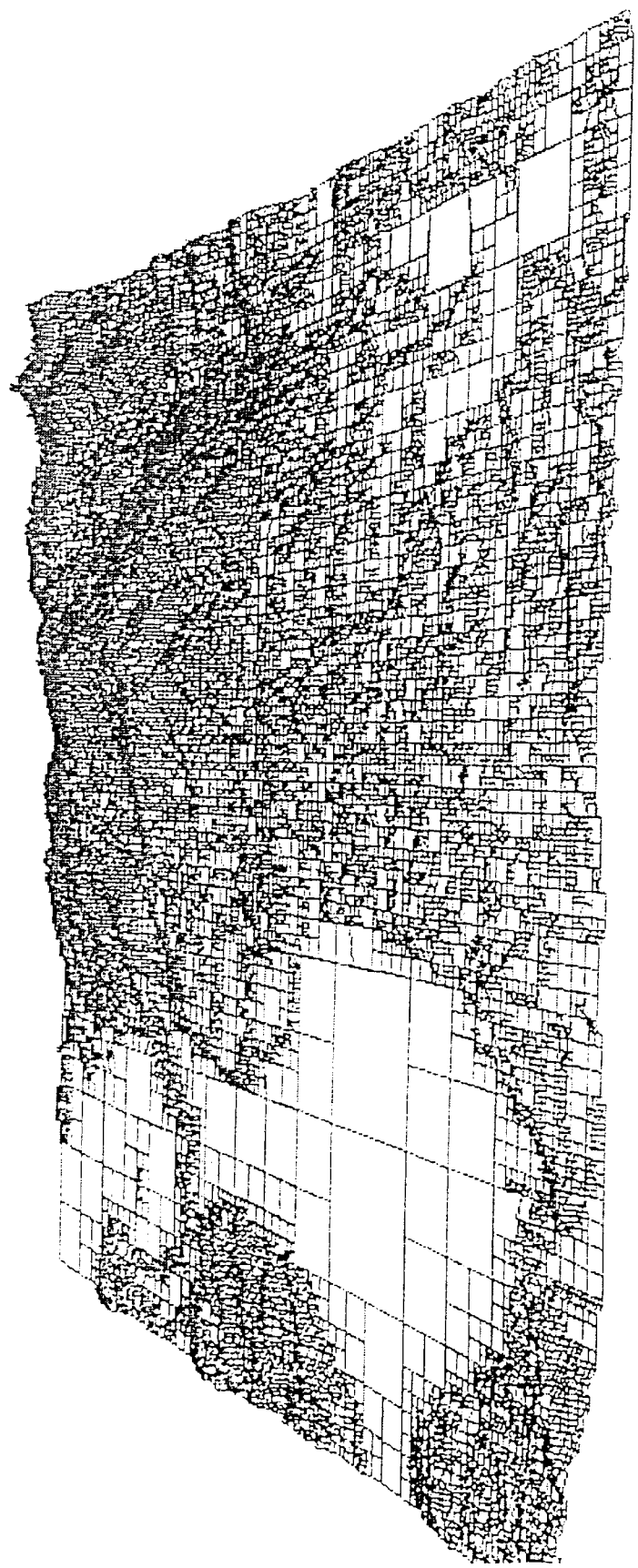
FIG. 12 shows an example of embodiment of perspective image generating.

A method of generating perspective images of terrain model, including the retrieving and accessing data from terrain model for generating images is provided. An accessing algorithm is used to retrieve parameters of nodes in the terrain model. The I, J, K parameters give the planar position and elevation of a node, and different color codes from a mapping table are assigned to each elevation band, S representing coverage area of a node to form perspective images of the terrain. The terrain model is used directly as input data without accessing the original DTED file. FIG. 12 shows an example of perspective images.

Prior art planning approaches use pre-defined obstacle models. However, the dangerous zone obstacle area varies during the execution of a flight plan whenever the flight altitude is changed. Besides, in the prior art DTED approach, the number of data retrievals and the cost of computation are excessive. Optimum flight plans or emergency changes of route in real time situations could be restrained by the number of data retrievals and the cost of computation when complexities of algorithms increased in standard DTED based system.

In the present invention, algorithms for CFIT warning based on Oct-tree terrain are presented. It is straightforward to represent terrain at various levels of resolution. An Oct-tree structure has the ability to modeling the terrain with sufficient accuracy at a coarser level by truncating or approximating unnecessary data, allowing terrain reference tasks to be performed efficiently. In the present preferred embodiment, by using the features of an Oct-tree terrain model, the terrain awareness and warning system related functions are implemented more efficient than in the prior art DTED based method. Moreover, compared with prior art of preflight planning system, the preferred embodiment shows a real-time flight path planning capability.

For a long-range global path planning in an airborne environment, either in a pre-planning or real-time situation, the Oct-tree hierarchical decomposition structure avoids excessive detail of terrain in the path planning phase. By exploiting the hierarchical nature of an Oct-tree terrain model, the path planning algorithm can operate at any layer of the Oct-tree terrain. Moreover, the path planning approach reduces the size of the search space by establishing a partial visibility graph of the navigation space which does not influence the choice of path and avoids details of the terrain. The Oct-tree terrain and visibility graph approach described in the present invention has been adapted to meet real-time computational requirements.

For CFIT warning related functions and obstacles avoidance, the same scheme as flight path planning can be used. By replacing the DTED with Oct-tree terrain or adding a layer of Oct-tree terrain, the comparing of predicted flight path with the terrain database for detecting possible collision and giving warning or for obtaining a new route for avoidance could be easily implemented. Furthermore, the terrain awareness and display can be performed in a more efficient way.

Although exemplary embodiments of the present invention are described above, this description does not limit the scope of the invention, which an be practiced in a variety of embodiments. For example, the real-time flight path planning algorithm can be embedded in a Flight Management Computer (FMC) for flight control. On the other hand, the flight path and terrain profile obtained from real-time flight path planning together with the encoded terrain database give the aircraft a forward looking capability particularly in general aviation during flights in mountainous area and urban area with buildings and man made obstacles. Accordingly, this capability can be easily extended to Controlled Flight Into Terrain Warning, Ground Proximity Warning, and Obstacles Avoidance. Moreover, terrain awareness and display could be one of the features coupled with CDTI.

From the point view of terrain database, with limited cost, the terrain model can be used separately or in parallel with the prior art of DTED database, and even replace the existing DTED type database. In the field of military, mission planning, terrain avoidance, terrain following, terrain matching, radar and threat line-of-sight masking, intervisibility shading are possible implementations. For non-aviation usage such as seafloor representation and sonar coverage, the estimation of GSM base station coverage can also be implemented.

While the present invention has been shown and described with reference to a preferred embodiment thereof, and in terms of the illustrative drawings, it should not be considered limited thereby. One skilled in the art could conceive of various possible modifications, omissions, and alterations and the content of any particular embodiment, without departing from the scope of the present invent.

What is claimed is:

1. A method of performing a real-time dynamic collision check comprising the steps of:
   using Digitized Terrain Elevation Data (DTED) to generate a terrain model, said terrain model containing a set of nodes, each of the nodes containing four parameters I,J,K,S, the four parameters I,J,K,S being obtained by mapping each elevation peak point I,J,K of a DTED file into a 3-D locational code of a corresponding Oct-tree, parameters I,J,K defining 3-D coordinates of a space location, a scaling factor of the elevation being introduced with divides the terrain elevation into bands, and parameter K representing scaled elevation, wherein the nodes of said Oct-tree with equal scaled value of elevation occurring in a same quadrant of a corresponding quad-tree are merged and the scaling factor is non-linear or, beginning with a baseline instead of mean sea level, parameter S is a coverage area of a node and is added to represent the size of a respective node, said bit positions of the four parameters I,J,K,S being interleaved to form an integer representation of the respective node;
   using the terrain model to provide a navigation space;
   accessing and retrieving the terrain model to generate a terrain map;
   identifying a list of the nodes in the navigation space based on flight altitude;
   establishing a ground track for a flight path segment, said ground track including a list of the nodes on the terrain map; and
   determining whether a flight path segment is in conflict with a dangerous zone by searching each of the nodes of the ground track for the flight path segment against the list of nodes in the navigation space.

2. The method of claim 1 wherein the collision check is performed by checking common nodes appearing in both of the node lists.

3. A method of performing a real-time dynamic weather condition avoidance comprising the steps of:
   using Digitized Terrain Elevation Data (DTED) to generate a terrain model, said terrain model containing a set of nodes, each of the nodes containing four parameters I,J,K,S, the four parameters I,J,K,S being obtained by mapping each elevation peak point I,J,K of a DTED file into a 3-D locational code of a corresponding Oct-tree, parameters I,J,K defining 3-D coordinates of a space location, a scaling factor of the elevation being introduced with divides the terrain elevation into bands, and parameter K representing scaled elevation, wherein the nodes of said Oct-tree with equal scaled value of elevation occurring in a same quadrant of a corresponding quad-tree are merged and the scaling factor is non-linear or, beginning with a baseline instead of mean sea level, parameter S is a coverage area of a node and is added to represent the size of a respective node, said bit positions of the four parameters I,J,K,S being interleaved to form an integer representation of the respective node;
   using the terrain model to provide a navigation space;
   accessing and retrieving the terrain model to generate a terrain map;
   establishing a start point and a goal point in the navigation space to determine a ground track for a direct flight path on the terrain map;
   identifying a dangerous zone based on the ground track and flight altitude;
   establishing a weather condition coverage area and representing the weather coverage area by a list of the nodes;
   adding the list of nodes of the weather coverage area to a list of the nodes of the dangerous zone to obtain a new dangerous zone;
   using said new dangerous zone to allocate a set of way-points for avoidance;
   constructing a visibility graph for a new navigation space, in which is a set of collision free path segments;
   linking the start point to the goal point by a flight path searching algorithm; and
   obtaining the terrain profile of the flight path from the terrain model.

4. The method of claim 3, wherein:
   the weather condition coverage area is a set of locational codes overlaying said terrain map; and
   weather conditions to be avoided include thunderstorms, windshear and any meteorological situations that appear in airspace.

5. A method of performing real-time dynamic obstacles avoidance comprising the steps of:
   using Digitized Terrain Elevation Data (DTED) to generate a terrain model, said terrain model containing a set of nodes, each of the nodes containing four parameters I,J,K,S, the four parameters I,J,K,S being obtained by mapping each elevation peak point I,J,K of a DTED file into a 3-D locational code of a corresponding Oct-tree, parameters I,J,K defining 3-D coordinates of a space location, a scaling factor of the elevation being introduced with divides the terrain elevation into bands, and parameter K representing scaled elevation, wherein the nodes of said Oct-tree with equal scaled value of elevation occurring in a same quadrant of a corresponding quad-tree are merged and the scaling factor is non-linear or, beginning with a baseline instead of mean sea level, parameter S is a coverage area of a node and is added to represent the size of the node, said bit positions of the four parameters I,J,K,S being interleaved to form an integer representation of a respective node;

using the terrain model to provide a navigation space;

accessing and retrieving the terrain model to generate a terrain map;

establishing a start point and a goal point in the navigation space to determine a ground track for a direct flight path on the terrain map;

identifying a dangerous zone based on the ground track and flight altitude;

establishing an obstacles coverage area and representing the obstacles coverage area by a list of the nodes;

adding the list of nodes of the obstacles coverage area to a list of the nodes of the dangerous zone to obtain a new dangerous zone;

using said new dangerous zone to allocate a set of way-points for avoidance;

constructing a visibility graph for a new navigation space, in which is a set of collision free path segments;

linking the start point to the goal point by a flight path searching algorithm; and obtaining the terrain profile of the flight path from the terrain model.

6. The method of claim 5, wherein:

the obstacles coverage area is a set of locational codes overlaying said terrain map; and the obstacles include terrain, peak, and any man-made obstacles.

* * * * *